March 25, 1941. J. V. COOK 2,236,085
BAKING OVEN
Filed July 22, 1940 2 Sheets-Sheet 1
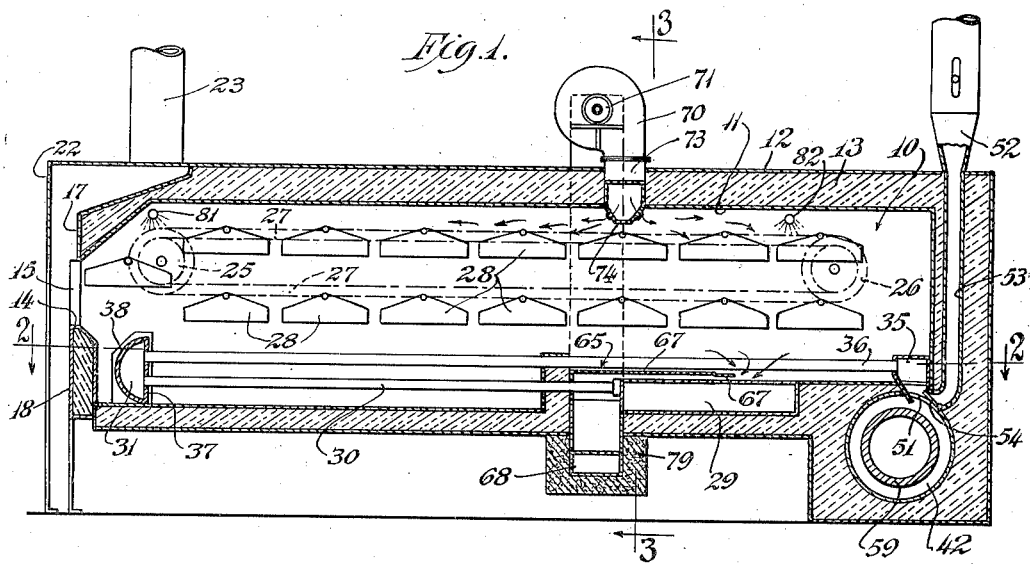
Inventor
John V. Cook
By Bair and Freeman
Attorneys March 25, 1941.  J. V. COOK  2,236,085
BAKING OVEN
Filed July 22, 1940   2 Sheets-Sheet 2
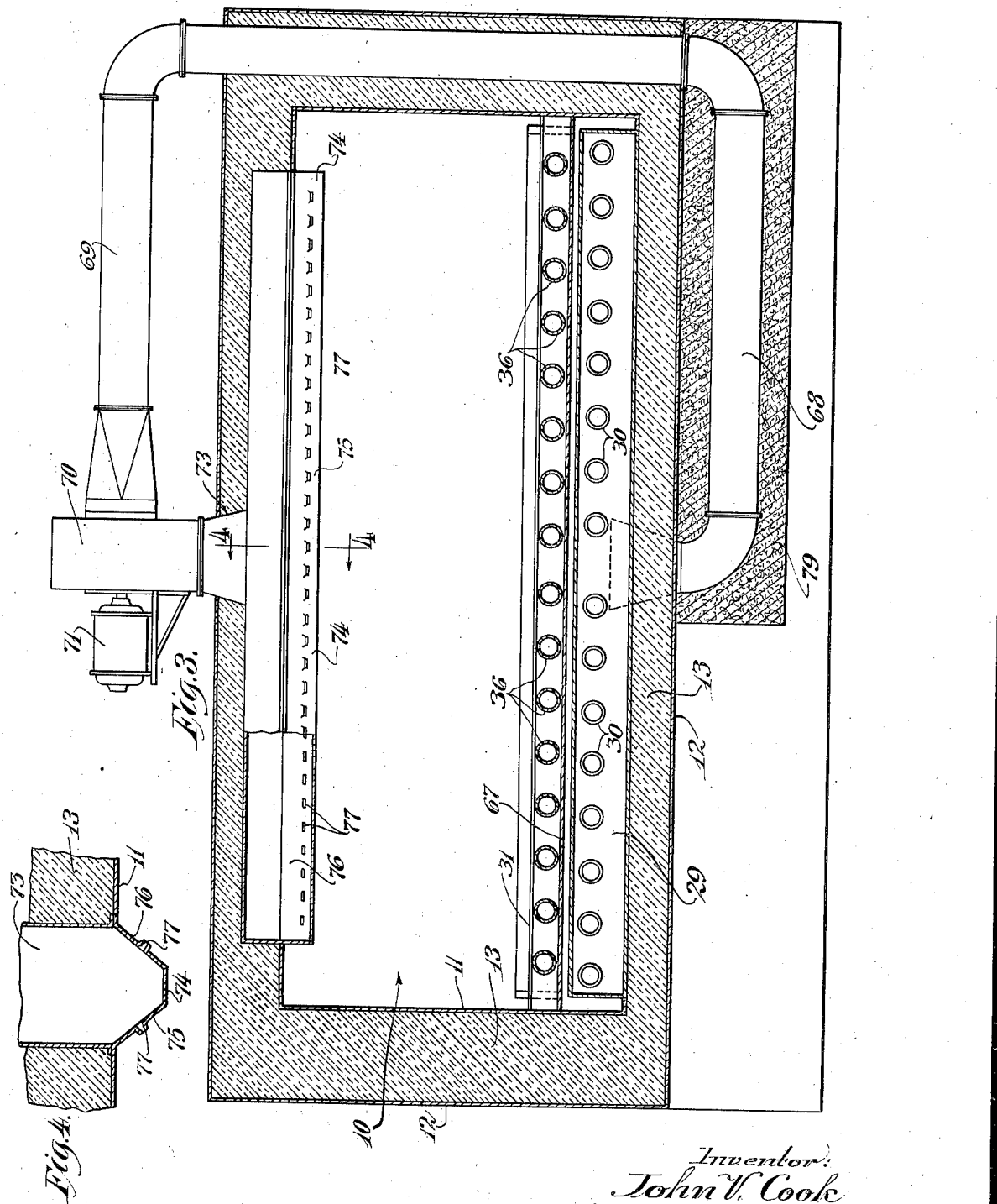
Inventor:
John V. Cook
By Bair and Freeman
Attorneys Patented Mar. 25, 1941

2,236,085

UNITED STATES PATENT OFFICE 2,236,085

BAKING OVEN

John V. Cook, Chicago, Ill., assignor to Petersen Oven Company, Chicago, Ill., a corporation of Illinois Application July 22, 1940, Serial No. 346,818

9 Claims. (Cl. 107—63)

The present invention pertains to baking ovens of the commercial type, wherein a multiplicity of units of foodstuffs, such as loaves of bread, are simultaneously baked.

The matter of obtaining proper and uniform coloring or browning of the bread or the like without producing undesirable characteristics in the crust portion of the bread, has long been of great concern to bakers. It has been recognized that agitation of the air or gases in the chamber of the baking oven tends to maintain a more uniform distribution of heat, and tends to prevent stratification of heat within the oven chamber, which results in a more uniform browning or coloring of the bread.

In one type of oven heretofore employed, substantial quantities of live steam are injected into the oven chamber for causing agitation of the air and gases therein. It has been found, however, that the use of steam as the medium for creating agitation of the air and gases within the oven chamber, tends to produce a gloss-effect on the exposed portions of the loaves of bread and, in addition, tends to produce a "rubbery" type crust. Moreover it has been found that the use of live steam for this purpose is extremely expensive, and in fact the cost for producing an adequate amount of steam for the purpose of agitation is several times the cost of producing adequate heat for performing the actual baking operation within the oven.

One of the primary objects of this invention resides in the provision of a novel construction and arrangement of means for efficiently agitating the air and gases within the baking chamber for obtaining uniform distribution of heat within the chamber and for effecting a uniform coloring or browning of the exposed portions of the loaves of bread without imparting undesirable characteristics to the exposed crust portions of the bread.

Another object is to provide an improved construction and arrangement of apparatus for agitating the air and gases within the oven chamber and which is relatively inexpensive to manufacture and is extremely economical in operation, in that no auxiliary source of heat energy, in addition to the usual oven heat, is required.

A further object of my invention resides in the provision of suction-blower apparatus associated with the oven chamber in a manner to effect removal of the air and gases adjacent one portion of the oven and forcibly injecting said air and gases into another portion of the oven so as to effect substantial agitation of the air and gases within the chamber, to obtain a relatively uniform distribution of heat within the chamber.

Still another object resides in the provision of a novel construction and arrangement of suction-blower apparatus associated with the baking chamber so that the air and gases are removed from one portion of the chamber, heated, and are then injected into another portion of the chamber, to cause agitation with the chamber and effecting uniform distribution of heat therein.

Other objects and advantages of this invention will be apparent from the following description, taken in connection with the drawings in which—

Figure 1 is a longitudinal vertical section through a baking oven, provided with apparatus embodying the present invention;

Figure 2 is a horizontal sectional view through the baking oven, taken substantially as indicated at line 2—2 of Fig. 1;

Figure 3 is an enlarged transverse sectional view through the oven, taken substantially as indicated at line 3—3 on Fig. 2; and Figure 4 is an enlarged detail sectional view through the upper nozzle of my agitating apparatus, taken as indicated at line 4—4 on Fig. 3.

The baking oven illustrated is of generally rectangular shape and rather of conventional height form, including a baking chamber 10 surrounded by a housing, the walls of which are composed of two spaced apart inner and outer sheets of metal indicated at 11 and 12 between which suitable heat insulating material indicated at 13 is interposed.

The forward end of the baking chamber 10 is provided with an opening 14 to afford convenient access to the interior of said chamber, said opening being closed by a door 15 of a conventional type. Above said door is a fixed panel portion 17, while below said door is a removable panel 18 including spaced-apart sheet metal walls between which is interposed suitable heat insulating material 13. In order to control the escape of hot air from the oven when the door is open so as to render it safe and convenient for an operator to work in front of the oven, I provide a hood structure 22 over the upper edge of the door 15, the upper end of said hood being connected to a vertical stack 23 which serves to receive and carry off the heated gases escaping from the oven chamber during the time the oven door is in open position.

Within the baking chamber 10 I have shown, diagrammatically, an endless conveyor of a conventional form which includes two pair of transversely spaced-apart sprocket wheels, designated at 25 and 26 at the forward and rearward ends, respectively, of the oven chamber, over which wheels are trained suitable chains indicated diagrammatically at 27, from which are suspended trays 28 adapted to receive and support thereon the pans containing the bread or other foodstuffs during their course of travel within the baking chamber.

Located within the baking chamber, intermediate its length, is a header 29, extending across the width of the chamber, at the bottom thereof. Said header is formed of sheet metal, having its forward face, or the face nearest the opening to the chamber, connected to a series of longitudinally extending flues 30, arranged in a bank in spaced-apart relation across the width of the oven chamber, as seen in Figs. 2 and 3. The opposite ends of the flues 30 terminate adjacent the forward end of the chamber 10, and are connected thereat to a header 31, which is also formed of sheet metal, and extends transversely of the chamber substantially parallel to and in alignment with the header 29. At the opposite or rear end of the chamber I provide a third header indicated at 35, which is also formed of sheet metal and which is connected to the header 31 by a series of longitudinally extending flues 36, arranged in banks transversely across substantially the entire width of the oven chamber, and disposed above and in staggered or offset relation to the series of flues 30, as seen in Figs. 2 and 3 of the drawings.

In the construction illustrated it may be understood that the header 31 is preferably formed of two parts, comprising a plate portion 37 which is rigidly connected to the flues and a dished back portion 38 which is removably connected to said plate to afford convenient access to the flues when desired, by merely removing the panel portion 18 as above mentioned.

As seen in Fig. 2 of the drawings, the header 31 is provided with partitions 39 so as in effect to provide four separate ducts, each of which communicates with a limited number of the flues 30 and 36, for assuring that the heated gases traveling forward in one group of flues 30 and 36, moves in a cycle through only that set of flues.

The means for producing heat for the oven chamber, and which is diagrammatically represented in Fig. 1, includes a mixing chamber 42 of cylindrical form and which, it may be understood, extends from one of the side walls of the oven to about the middle thereof. It may also be understood that said mixing chamber opens at its inner end to a suitable air pump, not shown, which, it may be understood, is connected by suitable ducts, not shown, to the header 29. By virtue of such an arrangement the air or other gases taken by the pump from the mixing chamber 42 are delivered through the ducts to the header 29 and thence through the flues 30 to the header 31, and flues 36 to the rearward header 35, from which latter header the heated air or gases are returned again to the mixing chamber 42 through a duct 51, opening from the header 35, as seen in Figs. 1 and 2 of the drawings.

Extending upwardly through the rear end wall of the housing is a stack 52, the lower end of which communicates with a conduit 53 which in turn opens at its lower end into the duct 51, so as to provide a means of communication between the header 35 and the mixing chamber 42. This arrangement permits the application of suction upon the header 35 in opposition to that created by the pump or blower (not shown), and the proportioning of the air and other gases which are permitted to be discharged through the stack 52 as compared with those recirculating through the system of flues, is effected by a damper member 54, pivotally mounted in the conduit 53, at the juncture with the duct 51.

Mounted within and in spaced relation to the walls of the mixing chamber is a tubular body 57 formed of suitable refractory material, such as fire clay, with which body is associated a suitable form of heat producing apparatus, not shown, and which may be understood to be either operated by liquid fuel or gas. To assist in obtaining a more uniform distribution of the heated gases to the banks of flues, the header 29 may be provided with partitions forming a plurality of separate ducts for supplying heat to separate units or groups of flues.

Referring now more specifically to the agitating apparatus constituting the present invention, I provide a power actuated suction-blower apparatus having inlet and outlet ducts communicating with the baking chamber 10 in a manner so that the heated air and gases from one portion of the chamber may be removed and forcibly injected into another portion of the chamber so as to cause substantial agitation of the air and gases within the baking chamber. It has been found that adequate agitation of the air and gases within the baking chamber results in a more uniform distribution of heat throughout the chamber, precluding stratification, and thereby producing proper and uniform coloring or browning of the exposed portion of the loaves of bread or other foodstuffs being baked within the chamber, without imparting to such exposed portions of the bread and the like a rubbery consistency.

In the construction shown, the apparatus is such as to remove the heated air and gases from the lower portion of the oven chamber and inject them into the upper portion of the oven chamber. The apparatus preferably is disposed intermediate the length of the oven and includes an intake nozzle, designated generally at 65, which surrounds and encloses portions of the flues 30 immediately adjacent the header 29. Said nozzle is of tube-like form including a top plate member 67 extending rearwardly over the header 29 in spaced relation thereto, with the forward edge of said plate disposed relatively close to the upper surface of the header to define an elongated slot, providing an inlet orifice extending substantially the entire width of the oven chamber. Said nozzle, as seen in Figure 3 of the drawings, is connected adjacent the middle of its length to the upturned end portion of a duct 68, which extends to one side of the oven and extends upwardly through a side wall of said oven, and is connected at its upper end to a reversely extending horizontal duct portion 69 which in turn is connected to the intake side of a suction-blower indicated generally at 70, which is driven by an electric motor designated at 71. The outlet or discharge end of the blower is connected by a duct 73, located substantially centrally of the width of the oven, to a discharge nozzle of tube-like form, indicated at 74, recessed into the upper wall and extending substantially across the width of the oven as seen in Figure 3. Said nozzle 74 is of the substantially closed type having a pair of oppositely disposed side walls 75—76 extending at an oblique angle, each of which walls is provided with a multiplicity of transversely spaced-apart slots or apertures 77.

As may be seen in Fig. 4 of the drawings, said walls 75—76 are disposed in such relation to each other that the streams of air and gases which are forced through the slots thereof, travel in an outwardly and downwardly direction, in the upper portion of the chamber, in the general direction of the opposite ends of the chamber. Because the air and gases which are drawn in through the elongated slot, which forms a part of the intake nozzle 65, are compelled to travel over the upper surface of the header 29, said air and gases become heated and therefore, when said heated air and gases are discharged at the upper portion of the oven chamber, it causes substantial agitation of the air and gases therein, for more uniformly distributing the heat in the chamber to effect a uniform browning and coloring of the exposed portions of the foodstuffs being baked within the chamber without imparting thereto undesirable characteristics, such as a tough, rubbery-like consistency to the crust portion of the foodstuffs.

To avoid heat loss by the forced removal of the air and gases from the oven for redirecting it thereinto by the suction blower apparatus, the duct portion 68 below the oven is encased in suitable heat insulating material such as designated at 79. In order to regulate the capacity of air and gases being removed from and injected into the chamber, a suitable control damper may be interposed in one of the ducts such, as in the horizontal duct portion 69 above the oven proper, or, if desired, a rheostat may be associated with the motor 71 for varying the speed of the impeller member of the suction-blower apparatus designated at 70.

If desired, the arrangement of agitating the air may be reversed from that herein disclosed. In other words, the air and gases may be removed from the upper portion of the baking chamber and injected therein at the lower portion of said chamber. The arrangement shown however is deemed preferable because it is possible to obtain at the upper portion of the baking chamber the equivalent to the bottom heat or the heat of the oven adjacent the bottom of the chamber. In other types of oven construction it may be desirable to remove the air and gases adjacent the upper portion of the chamber and heating said air and gases by directing them through ducts in close proximity to the stack or the heat-producing apparatus, and then redirecting said heated air currents back into the upper portion of the chamber.

In ovens of the general type herein disclosed, it is desirable to supply a small quantity of live steam into the chamber during the baking operation, and this may be accomplished in any convenient manner, such as shown diagrammatically by conduits indicated at 81 and 82 in the upper portion of the oven chamber, immediately above the conveyor. It has been found that a small quantity of live steam assists in producing the desired characteristics in the crust or exposed portions of the loaves of bread.

Although I have herein shown and described a preferred embodiment of my invention, manifestly as above mentioned it is capable of substantial modification and rearrangement without departing from the spirit and scope thereof. I do not, therefore, wish to be understood as limiting this invention to the precise embodiment herein disclosed, except as I may be so limited by the appended claims.

I claim as my invention:

1. In combination, a baking oven including a baking chamber, means for indirectly heating said chamber, and power actuated suction-blower apparatus including inlet and outlet ducts communicating with the chamber, one of said ducts being located in close proximity to a portion of said indirect heating means, whereby air and gases are drawn from the chamber, and heated and again forcibly injected into said chamber for maintaining the air and gases within the chamber in an agitated condition.

2. In combination, a baking oven including a baking chamber, means for indirectly heating said chamber, and power actuated suction-blower apparatus including outlet and inlet ducts communicating with the chamber, one of said ducts being located in close proximity to the upper portion of the chamber and the other of said ducts being located adjacent the lower portion of said chamber, said ducts each including nozzles extending transversely of the chamber in direct communication with substantially the entire width of said chamber, whereby the heated air and gases are withdrawn from the portion of the chamber adjacent the inlet duct substantially across the entire width thereof and forcibly injected into the portion of the chamber adjacent the outlet duct substantially across the entire width of said chamber, for maintaining the air and gases within the chamber in an agitated condition.

3. In combination, a baking oven including a baking chamber, means for indirectly heating said chamber, and power actuated suction-blower apparatus including outlet and inlet ducts communicating respectively with the lower and upper portions of said chamber, said ducts each including nozzles extending transversely of the chamber in direct communication with substantially the entire width of said chamber, whereby the heated air and gases are withdrawn from the lower portion of the chamber and substantially across the entire width thereof, forcibly injected into the upper portion of the chamber substantially across the entire width thereof, for maintaining the air and gases within the chamber in an agitated condition.

4. In combination, a baking oven including a baking chamber having top and bottom walls, means for heating said chamber, and power actuated suction-blower apparatus including inlet and outlet ducts communicating with opposite portions of the oven chamber, adjacent the middle of the length of the chamber, said ducts each including nozzles extending transversely of the chamber in direct communication with substantially the entire width of the chamber, one of said nozzles being disposed adjacent the upper wall and the other nozzle adjacent the lower portion of the chamber, whereby heated air and gases are removed from one portion of the chamber and forcibly injected into another portion of the chamber for maintaining the air and gases within the chamber in an agitated condition.

5. In combination, a baking oven including a baking chamber, means for indirectly heating said chamber, and power actuated suction-blower apparatus including outlet and inlet ducts communicating respectively with the lower and upper portions of said chamber, said ducts each including nozzles extending transversely of the chamber in direct communication with substantially the entire width of the chamber, whereby the heated air and gases are withdrawn from the lower portion of the chamber and forcibly injected into the upper portion of the chamber for maintaining the air and gases within the chamber in an agitated condition.

6. In combination, a baking oven including a baking chamber, means for indirectly heating said chamber, and power actuated suction-blower apparatus including outlet and inlet ducts communicating respectively with the lower and upper portions of said chamber, the inlet duct including a nozzle extending transversely of the chamber formed to direct the air and gases toward opposite ends of the chamber, whereby the heated air and gases are withdrawn from the lower portion of the chamber and forcibly injected into the upper portion of the chamber for maintaining the air and gases within the chamber in an agitated condition.

7. In combination, a baking oven including a baking chamber, means for indirectly heating said chamber, and power actuated suction-blower apparatus including outlet and inlet ducts communicating respectively with the lower and upper portions of said chamber, the inlet duct including a nozzle of tube-like form extending transversely of the chamber, said nozzle being formed with two oppositely disposed series of apertures for directing a multiplicity of streams of air and gases in opposite directions toward the ends of the chamber, whereby the heated air and gases are withdrawn from the lower portion of the chamber and forcibly injected into the upper portion of the chamber for maintaining the air and gases within the chamber in an agitated condition.

8. In combination, a baking oven including a baking chamber, means for indirectly heating said chamber including a header extending substantially the width of the oven, and a multiplicity of flues communicating with said header, and power actuated suction-blower apparatus including outlet and inlet ducts communicating respectively with the lower and upper portions of said chamber, said outlet duct including a nozzle extending transversely of and substantially occupying the width of the chamber, said nozzle including a plate disposed above and in close spaced-apart relation to the top of said header with the edge thereof terminating in close proximity to the header to form a narrow elongated slot extending substantially the entire length of the nozzle, whereby air and gases are drawn from the lower portion of the oven chamber, over said header, and forcibly injected into the upper portion of the chamber for maintaining the air and gases within the chamber in an agitated condition.

9. In combination, a baking oven including a baking chamber having top and bottom walls, means for heating said chamber, and power actuated suction-blower apparatus including inlet and outlet ducts communicating with opposite portions of the oven chamber, adjacent the middle of the length of the chamber, said ducts each including nozzles extending transversely of the chamber in direct communication with substantially the entire width of the chamber, the inlet duct including a nozzle of tube-like form extending transversely of the chamber, said nozzle being formed with two oppositely disposed series of apertures for directing a multiplicity of streams of air and gases in opposite directions toward the ends of the chamber, one of said nozzles being disposed adjacent the upper wall and the other nozzle adjacent the lower portion of the chamber, whereby heated air and gases are removed from one portion of the chamber and forcibly injected into another portion of the chamber for maintaining the air and gases within the chamber in an agitated condition.

JOHN V. COOK.